(12) United States Patent
Noll et al.

(10) Patent No.: US 8,104,059 B2
(45) Date of Patent: Jan. 24, 2012

(54) SYSTEM AND METHOD FOR SERVING ADVERTISING DATA FROM THE INTERNET

(75) Inventors: Roland Noll, San Antonio, TX (US); Mary Catherine McCarthy, San Antonio, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 281 days.

(21) Appl. No.: 11/868,866

(22) Filed: Oct. 8, 2007

(65) Prior Publication Data

US 2009/0094641 A1 Apr. 9, 2009

(51) Int. Cl.
- H04N 7/10 (2006.01)
- H04N 7/025 (2006.01)
- H04N 5/445 (2006.01)
- G06F 3/00 (2006.01)
- G06F 13/00 (2006.01)

(52) U.S. Cl. ........... 725/35; 725/34; 725/36; 725/46

(58) Field of Classification Search ............ 725/32–36, 725/46, 119, 120
See application file for complete search history.

(56) References Cited

U.S. PATENT DOCUMENTS

| | | | |
|---|---|---|---|
| 6,449,767 B1 * | 9/2002 | Krapf et al. | 725/110 |
| 6,909,837 B1 | 6/2005 | Unger | |
| 7,206,754 B1 | 4/2007 | Spector | |
| 7,212,988 B1 | 5/2007 | Feldten | |
| 7,263,709 B1 * | 8/2007 | Krapf | 725/46 |
| 7,613,691 B2 * | 11/2009 | Finch | 707/3 |
| 7,631,327 B2 * | 12/2009 | Dempski et al. | 725/34 |
| 2001/0047294 A1 | 11/2001 | Rothschild | |
| 2002/0032904 A1 | 3/2002 | Lerner | |
| 2002/0046299 A1 * | 4/2002 | Lefeber et al. | 709/318 |
| 2002/0069407 A1 | 6/2002 | Fagnani | |
| 2002/0087969 A1 | 7/2002 | Brunheroto | |
| 2002/0162120 A1 * | 10/2002 | Mitchell | 725/135 |
| 2003/0033157 A1 * | 2/2003 | Dempski et al. | 705/1 |
| 2003/0083937 A1 | 5/2003 | Hasegawa | |
| 2003/0110507 A1 * | 6/2003 | Dimitrova et al. | 725/110 |
| 2003/0149975 A1 * | 8/2003 | Eldering et al. | 725/34 |
| 2004/0073915 A1 | 4/2004 | Dureau | |
| 2004/0107137 A1 | 6/2004 | Skinner | |
| 2004/0117254 A1 | 6/2004 | Nemirofsky | |
| 2004/0158528 A1 | 8/2004 | Zuili | |
| 2005/0015797 A1 * | 1/2005 | Noblecourt et al. | 725/32 |
| 2005/0080665 A1 | 4/2005 | Bowman | |

(Continued)

FOREIGN PATENT DOCUMENTS

EP 1 339 229 A2 8/2003

(Continued)

*Primary Examiner* — Andrew Koenig
*Assistant Examiner* — Jason J Chung
(74) *Attorney, Agent, or Firm* — G. Michael Roebuck

(57) ABSTRACT

A system and method are disclosed including a computer program, the computer program comprising instructions to receive at an IPTV system node, advertising tokens data having advertising characteristics data and address data; instructions to filter at the IPTV system node the advertising tokens based on a correlation between the advertising characteristic data and filtering criteria data; instructions to extract from the filtered advertising tokens, address data representing at least two advertising addresses on the Internet World Wide Web; instructions to concatenate at the IPTV node the address data for the advertising addresses to form a uniform resource indicator (URI) for a resource on the Internet resource; and instructions to send advertising data from the Internet resource to an end user device through the IPTV node.

22 Claims, 7 Drawing Sheets

U.S. PATENT DOCUMENTS

| | | | |
|---|---|---|---|
| 2005/0138658 A1* | 6/2005 | Bryan | 725/46 |
| 2005/0193410 A1* | 9/2005 | Eldering | 725/34 |
| 2005/0278731 A1 | 12/2005 | Cameron | |
| 2006/0004632 A1 | 1/2006 | Kelsen et al. | |
| 2006/0026629 A1 | 2/2006 | Harris | |
| 2006/0080239 A1 | 4/2006 | Harlog | |
| 2006/0184989 A1* | 8/2006 | Slothouber | 725/110 |
| 2006/0195866 A1 | 8/2006 | Thukral | |
| 2006/0253323 A1 | 11/2006 | Phan | |
| 2006/0256133 A1 | 11/2006 | Rosenberg | |
| 2007/0074258 A1 | 3/2007 | Wood | |
| 2007/0078706 A1 | 4/2007 | Datta | |
| 2007/0157228 A1 | 7/2007 | Bayer | |
| 2007/0294721 A1* | 12/2007 | Haeuser et al. | 725/34 |
| 2008/0046917 A1* | 2/2008 | de Heer | 725/32 |
| 2008/0092158 A1* | 4/2008 | Bhatnagar et al. | 725/34 |
| 2008/0092159 A1* | 4/2008 | Dmitriev et al. | 725/34 |
| 2008/0092171 A1* | 4/2008 | Roberts et al. | 725/46 |
| 2008/0092199 A1* | 4/2008 | McCarthy et al. | 725/133 |

FOREIGN PATENT DOCUMENTS

WO 2005/125190 A2 12/2005

\* cited by examiner

SYSTEM AND METHOD FOR SERVING ADVERTISING DATA FROM THE INTERNET

FIELD OF THE DISCLOSURE

The present disclosure relates to the field of serving data from the Internet.

BACK GROUND OF THE DISCLOSURE

Targeted advertisements have historically been mailed to large targeted geographic areas such as a particular city, so that regional advertisers reach only persons who are deemed by the advertiser as most likely to be responsive to their advertisements. Advertisements are a component in digital video services, including live or pre-recorded broadcast television TV, special or pay-per-view programming, video on demand (VOD), and other content data choices available to subscribers.

DETAILED DESCRIPTION

Figure 1:
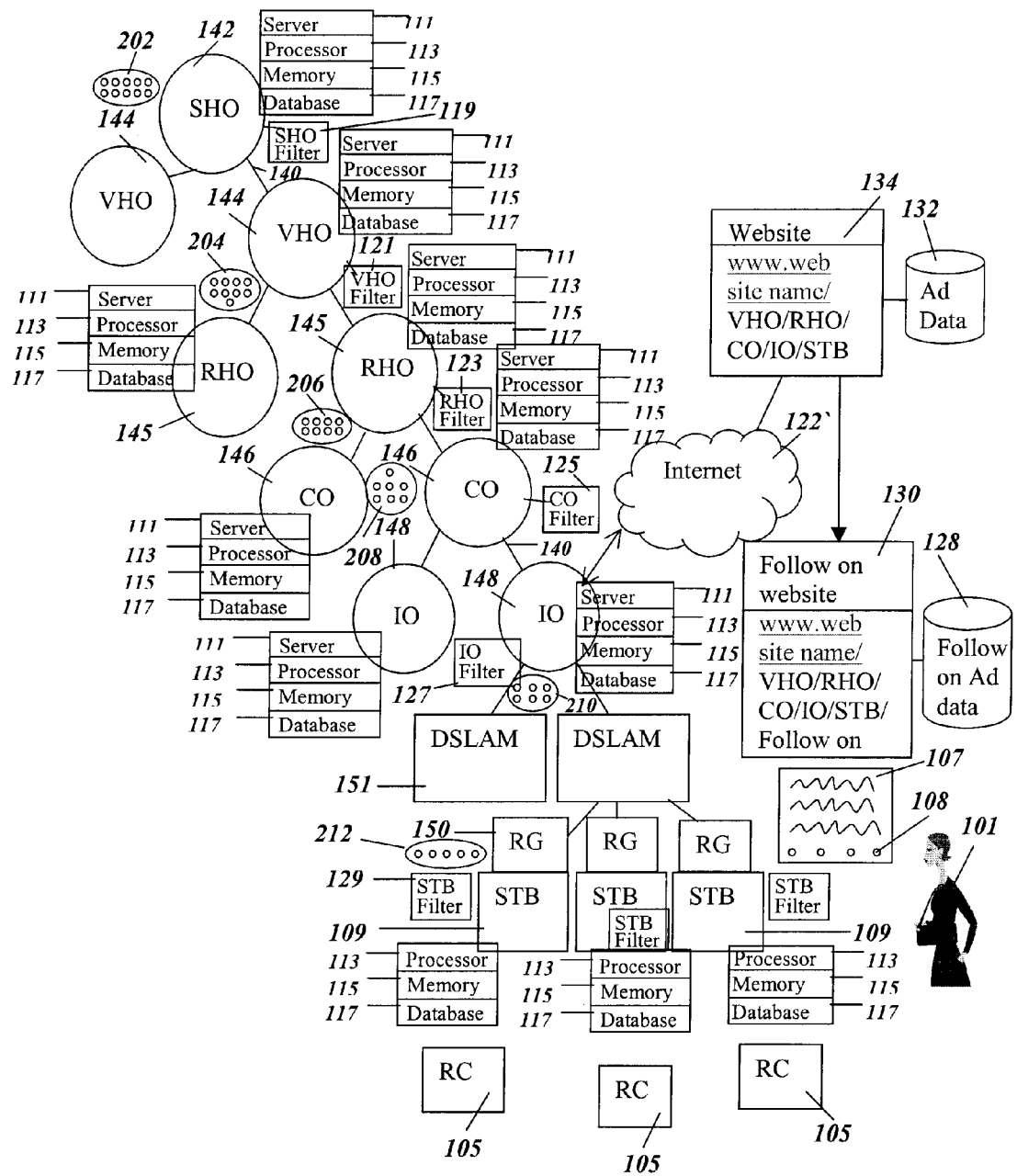
FIG. 1 depicts an illustrative embodiment of a system for serving advertising data from the Internet.

In an illustrative embodiment, an advertiser sends groups of advertising tokens representing different advertisements targeted at different groups of end users in an internet protocol television (IPTV) system. Each advertising token contains advertising characteristic data representative of the advertisement. A set of filters are located at nodes of the IPTV system that contain advertising criteria. The tokens advertising characteristic data are compared to filtering advertising criteria. Those tokens having advertising characteristic data that correlate or match the filtering criteria are passed along by the filter to the next IPTV node in the hierarchically arranged IPTV network. Each successive filter provides advertising criteria that is used to select or filter advertising tokens that relate to the end users served by the IPTV node at which the filter resides. Filtered or selected tokens are accessed to extract address data. The address data (representing portions of a URI or URL) is a portion of a uniform resource indicator (URI) or uniform resource locator (URL). The address data are concatenated to form a URI or URL for a website from which advertising data is served to an end user in the IPTV network.

In another embodiment, a computer readable medium is disclosed, the medium having a computer program embedded therein, that when executed by a processor performs a method useful for delivering advertising data, in an IPTV system, the computer program comprising instructions to receive at an IPTV system node, advertising tokens data having advertising characteristics data and address data; instructions to filter at the IPTV system node, the advertising tokens data based on a correlation between the advertising characteristic data and filtering criteria data; instructions to extract at the IPTV system node, address data from the filtered advertising tokens data representing at least two advertising addresses on the Internet World Wide Web; instructions to concatenate at the IPTV node, the address data for the advertising addresses to form a uniform resource indicator (URI) for a web site on the Internet World Wide Web; and instructions to send advertising data from the web site to an end user device through the IPTV node. In another embodiment, the URI address an Internet resource containing advertising data wherein the resource is mot on the World Wide Web.

In another embodiment of the medium, the address data further comprise portions of a URI in the advertising tokens data received at an IPTV node selected from the group consisting of video hub office (VHO), regional hub office (RHO), central office (CO), intermediate office (IO) and set-top box (STB). In another embodiment of the medium, the instructions to send the advertising data further comprise instructions to insert the advertising data into an IPTV video data stream being sent to the end user device from the IPTV node. In another embodiment of the medium, the computer program further comprises but is not limited to instructions to adjust the filtering criteria data based on an average of end user profile data for end users served by the IPTV node.

In another embodiment of the medium, the end user profile data are selected from the group consisting of age, gender, ethnicity, physical location, income, interests, purchase history, viewing history, and family size. In another embodiment of the medium, the computer program further comprises instructions to receive follow on advertising token data; instructions to extract follow on address data from the follow on advertising token data; instructions to concatenate the follow on address data to the URI to form a follow on URI; and instructions to send follow on advertising data from a web site at the follow on URI through the IPTV node to the end user device. In another embodiment of the medium the computer program further comprises instructions to receive follow on request data from the end user device for the follow on advertising data.

In another embodiment of the medium the computer program further comprises instructions to receive update token data; instructions to compare token identifier data for the update token data to token identifier for a plurality of advertising tokens; and instructions to replace the advertising token having the same token identifier data as the token identifier as the replacement token, with the replacement token. In another embodiment of the medium the instructions to concatenate the address data further comprise instructions to compare advertisement identifier data for the advertising tokens and instructions to concatenate the address data for the advertising tokens having the same advertisement identifier data.

In another embodiment a system for delivering advertising data in an internet protocol television (IPTV) system is disclosed, the system comprising but not limited to a processor in data communication with a computer readable medium; an adaptive filter in data communication with the processor; and a computer program embedded in the computer readable medium the computer program comprising instructions to receive at an IPTV system node, advertising tokens data having advertising characteristics data and address data, instructions to filter at the IPTV system node the advertising tokens data based on a correlation between the advertising characteristic data and filtering criteria data, instructions to extract at the IPTV system node address data from the filtered advertising tokens address data representing at least two advertising addresses on the Internet World Wide Web, instructions to concatenate at the IPTV node the address data for the advertising addresses to form a uniform resource indicator (URI) for a web site on the Internet World Wide Web and instructions to send advertising data from the web site to an end user device through the IPTV node.

In another embodiment of the system, the address data further comprise portions of a URI address in the advertising data from tokens received at an IPTV node selected from the group consisting of video hub office (VHO), regional hub office (RHO), central office (CO), intermediate office (IO) and set-top box (STB). In another embodiment of the medium the instructions to send the advertising data further comprise instructions to insert the advertising data into an IPTV video data stream being sent to the end user device from the IPTV node. In another embodiment of the system, the instructions to adjust the filtering criteria data based on an average of end user profile data for end users served by the IPTV node. In another embodiment of the system, the end user profile data are selected from the group consisting of age, gender, ethnicity, physical location, income, interests, purchase history, viewing history, and family size.

In another embodiment of the system the computer program further comprises instructions to receive follow on advertising token data; instructions to extract follow on address data from the follow on token data; instructions to concatenate the follow on address data to the URI to form a follow on URI; and instructions to send follow on advertising data from a web site at the follow on URI to the end user device. In another embodiment of the system, the computer program further comprises instructions to receive request data from the end user device for the follow on advertising data. In another embodiment of the system, the computer program further comprises instructions to receive update token data; instructions to compare token identifier data for the update token data to token identifier data for each of the advertising tokens; and instructions to replace advertising token data for an advertising token having a same token identifier data as the token identifier data as the replacement token, with the replacement token data. In another embodiment of the system, the instructions to concatenate the address data further comprise instructions to compare advertisement identifier data for the advertising tokens data and instructions to concatenate the address data for the advertising tokens having the same advertisement identifier data.

In another embodiment, a data structure embedded in a computer readable medium is disclosed, the data structure comprising a first field for containing data indicative of a portion of a uniform resource indicator (URI) from an advertising token for concatenation with other portions of a URI for addressing a resource on the Internet to provide advertising data to an end user. In another embodiment of the medium, the data structure further comprises but is not limited to a second field for containing data indicative of an advertising characteristic for the advertising data. In another embodiment of the medium, the data structure further comprises but is not limited to a third field containing data indicative of an advertising token identifier for comparison with token identifier data for an update token for replacing the advertising token with the update token. In another embodiment of the medium, the data structure further comprises but is not limited a fourth field containing data indicative of a first advertisement token identifier for a first advertising toke for comparison with other advertising token identifiers for concatenating partial URI address data from the first token with other partial URI address data from other tokens with matching advertisement token data identifiers.

Turning now to FIG. 1, in another illustrative embodiment, an IPTV system sends a video data stream 202 comprising television programming content data and advertising tokens data to an end-user device set top box 109. The set top box 109 includes a processor 113, memory 115 and database 117. The set top box 109 transfers the video data and filtered tokens data to an end user device display, which in the present example is a television 107. In another embodiment, IPTV channels of video data are first broadcast as video data comprising video content and advertising tokens data in an internet protocol (IP) from a server at a super hub office (SHO) 142 to a video hub office (VHO) server 144, to a regional hub office (RHO) 145 to a central office (CO) server 146, to an intermediate office (IO) 148 server. Targeted advertising token data can also be inserted into the video data stream by a server 111 located at the RHO, VHO, CO or IO. The IPTV system includes a hierarchically arranged network of servers wherein the SHO transmits video and advertising data to at least one VHO and RHO to a server location close to a subscriber or end user device, such as a CO 146 or IO 148 server 111. The IPTV servers are interconnected via IPTV transport 140 which also provide data communication for Internet and voice over Internet protocol (VoIP) data services to subscribers in the IPTV system. In another embodiment, the IPTV transport 140 is a group of high speed communication lines such as fiber optic cables.

The IPTV channels are sent in an IP data multicast group to end user IPTV system access nodes. In another embodiment the end user access node to the IPTV system is a digital subscriber line access multiplexer (DSLAM) 151 and gateway 150. In another embodiment the gateway 150 is a residential gateway (RG). A video data multicast or unicast for a particular IPTV channel is joined by the set-top boxes (STBs) at IPTV subscriber homes from the DSLAM 151. Each SHO, RHO, VHO, CO and IO includes a server 111, processor 113, a memory 115 and a database 117. The STB includes a processor 113, a memory 115 and a database 117.

In another embodiment, the IPTV system is a triple-play system providing IPTV video data, voice over internet protocol (VoIP) voice data connectivity and high speed Internet data connectivity to end users. In another embodiment, the IO server delivers IPTV, Internet and VoIP data and content to end user devices in the IPTV system. The television content is delivered in an IPTV format via multicast and television advertising data via unicast or multicast depending on a targeted television advertising group of end user devices to which the advertising data is directed. In another particular embodiment, end user devices include, but are not limited to, wire line phones, portable phones, lap top computers, personal computers (PC), cell phones, mobile MP3 players communicate with the communication system, i.e., an IPTV network through residential gateway (RG) 150 and high speed communication lines which are shown for an example as IPTV transport 140.

In another illustrative embodiment, an end user 101 views television data 107 from a first end user device 109 which in the current example is a television 110. A set of icons 108 representing a set of follow on advertising request buttons are provided which are displayed as part of the television data 107. An end user 101 uses remote control (RC) 105 to select one of the icons 108 to indicate a request for a follow on advertisement to a current advertisement displayed on television display 107.

As shown in FIG. 1, in a particular embodiment an adaptive filter is associated with each node in the IPTV system node. Thus, an SHO adaptive filter 119 is associated with the SHO, a VHO adaptive filter 121 is associated with the VHO, an adaptive RHO filter 123 is associated with the RHO, a CO adaptive filter 125 is associated with the CO, an IO adaptive filter 127 is associated with the IO and adaptive filter 129 is associated with the STB. Each adaptive filter contains filtering criteria data which are continually adjusted or adapted based on an average of end user profile data for end users served by the IPTV node at which the filter resides. The end user profile data can include but are not limited to age, gender, ethnicity, physical location, income, interest, purchase history, viewing history, and family size.

In an illustration embodiment, each IPTV node receives a group of advertising tokens. Each of the advertising tokens can include but are not limited to advertising characteristics, and address data. In each IPTV node the advertising tokens are filtered by the adaptive filter based on the advertising characteristics as compared to the advertising criteria embodied by the adaptive filter. The address data from the filtered nodes is concatenated to form a uniform resource indicator (URI) for a resource such as a website on the Internet. The Internet resource can e located on the World Wide Web. Advertising data from the Internet resource or website addressed by the URI is sent to an end-user device through a server or node in the IPTV system.

Thus the concatenated addresses are utilized to access an Internet resource, such as website 134 and advertising data 132 over the Internet 122. The end user may also access follow on advertisements through a selection button 108 for a follow on advertisement on display 107. Follow on advertisements are accessed by concatenating a follow on URI address to access the follow on resource such as website 130 and follow on data 128. When a user selects a follow on advertisement button 108 via RC 105, a following URI address is concatenated to the existing URI address to access the follow on advertisement data 128 at a resource, such as website 130.

Figure 2:
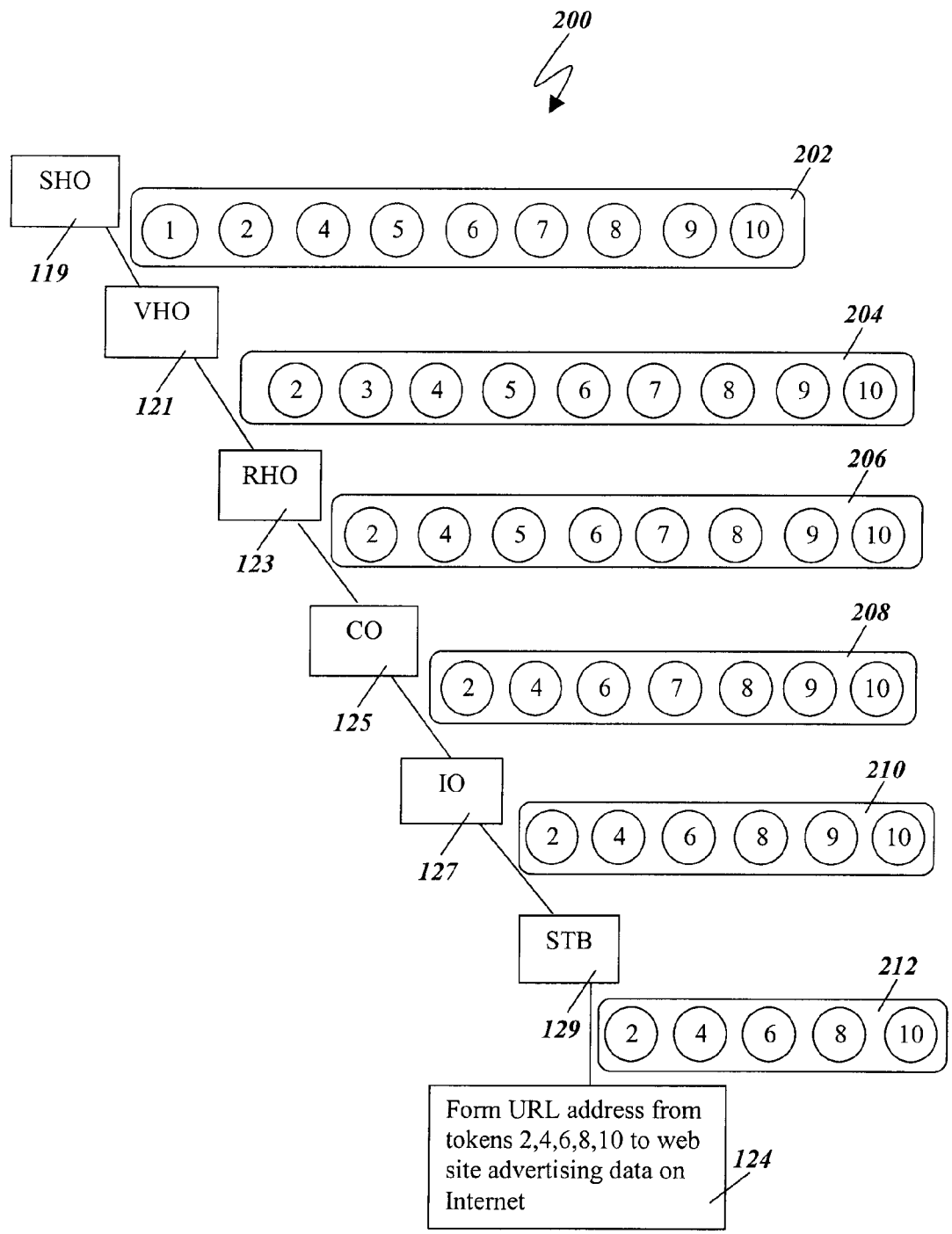
FIG. 2 depicts another illustrative embodiment of a system for serving advertising data from the Internet.

Turning now to FIG. 2, a group of advertising tokens 202 are passed from SHO filter 119 at the SHO. As shown in FIG. 2, tokens 1, 2, 3, 4, 5, 6, 7, 8, 9 and 10 are passed by the SHO filter based a correlation between on the advertising characteristics data of the tokens 202 and the filtering criteria data for filter 119. The filtering criteria for adaptive filter 119 are based on an average end user profile data for all end user profiles for end-users served data by the SHO at which filter 119 resides. Advertising tokens 2, 3, 4, 5, 6, 7, 8, 9 and 10 are passed by the VHO filter based on a correlation between the advertising characteristics data of the tokens 204 and the filtering criteria data for filter 121. The advertising tokens are provided by an advertiser wanting to send targeted advertising data to end users whose end user profiles correlate or compare well with advertising characteristic data provided in the advertising tokens. The filtering criteria for adaptive filter 121 are based on the average end user profile for end user profiles data for end-users served data by the VHO at which filter 121 resides.

Tokens 2, 4, 5, 6, 7, 8, 9 and 10 are passed by the RHO filter based on a correlation between the advertising characteristics data of the tokens 206 and the filtering criteria data for filter 123. The filtering criteria for adaptive filter 123 are based on the average end user profile data for end user profiles for end-users served data by the RHO at which filter 123 resides. Tokens 2, 4, 6, 7, 8, 9 and 10 are passed by the CO filter based on a correlation between the advertising characteristics data of the tokens 208 and the filtering criteria data for filter 125. The filtering criteria data for adaptive filter 125 is based on the average end user profile data for end user profiles for end-users associated with the CO at which filter 125 resides.

Tokens 2, 4, 6, 8, 9 and 10 are passed by the IO filter based on a correlation between the advertising characteristics data of the tokens 210 and the filtering criteria data for filter 127. The filtering criteria for adaptive filter 127 is based on the average end user profile data for end user profiles for end-users served data by the IO at which filter 127 resides. Tokens 2, 4, 6, 8 and 10 are passed by the STB filter based on a correlation between the advertising characteristics data of the tokens 212 and the filtering criteria data for filter 129. The filtering criteria data for adaptive filter 129 is based on the average end user profile data for all end user profiles for end-users associated with the STB at which filter 129 resides. As shown in the figure to the address data for advertising tokens 2, 4, 6, 8 and 10 are concatenated to form a URI to address advertising data at a website on the Internet at 214.

Figure 3:
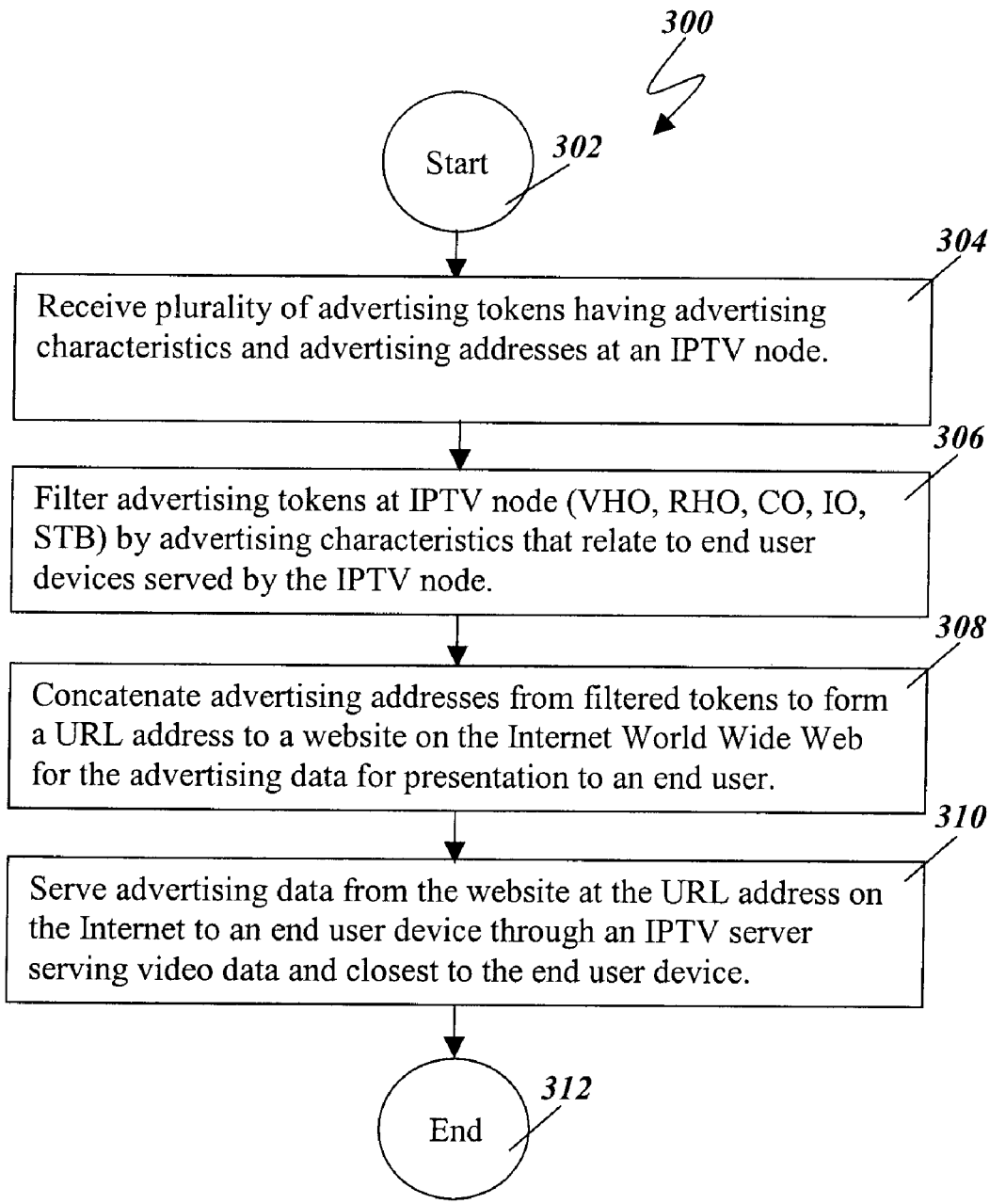
FIG. 3 depicts a flow chart of functions performed in another illustrative embodiment for delivering advertising data.

Turning now to FIG. 3, a flowchart of functions performed in another illustrative embodiment are illustrated in a flowchart 300. The flowchart 300 starts at terminal 302 and proceeds to block 304 where an embodiment receives a plurality of advertising tokens having advertising characteristics and advertising addresses at an IPTV node. In another illustrative embodiment at block 306 another embodiment also filters the advertising tokens at an IPTV node such as a VHO, RHO, CO, IO or STB. The tokens are filtered by the advertising characteristics contained in the tokens that relate to the end user devices served by the IPTV node at which the tokens are filtered. At block 308 the advertising addresses from the filtered tokens are concatenated to form a URI address to an Internet resource, such as a website on the Internet World Wide Web. The Internet resource or web site provides advertising data for streaming to an end user device for presentation to an end user. At block 310 another embodiment further sends the advertising data from the website at the URI to an end user device through an IPTV server that serves video data to the end-user device. In another embodiment, the IPTV server that serves the end user device is also closest physically or logically to the end-user device.

Figure 4:
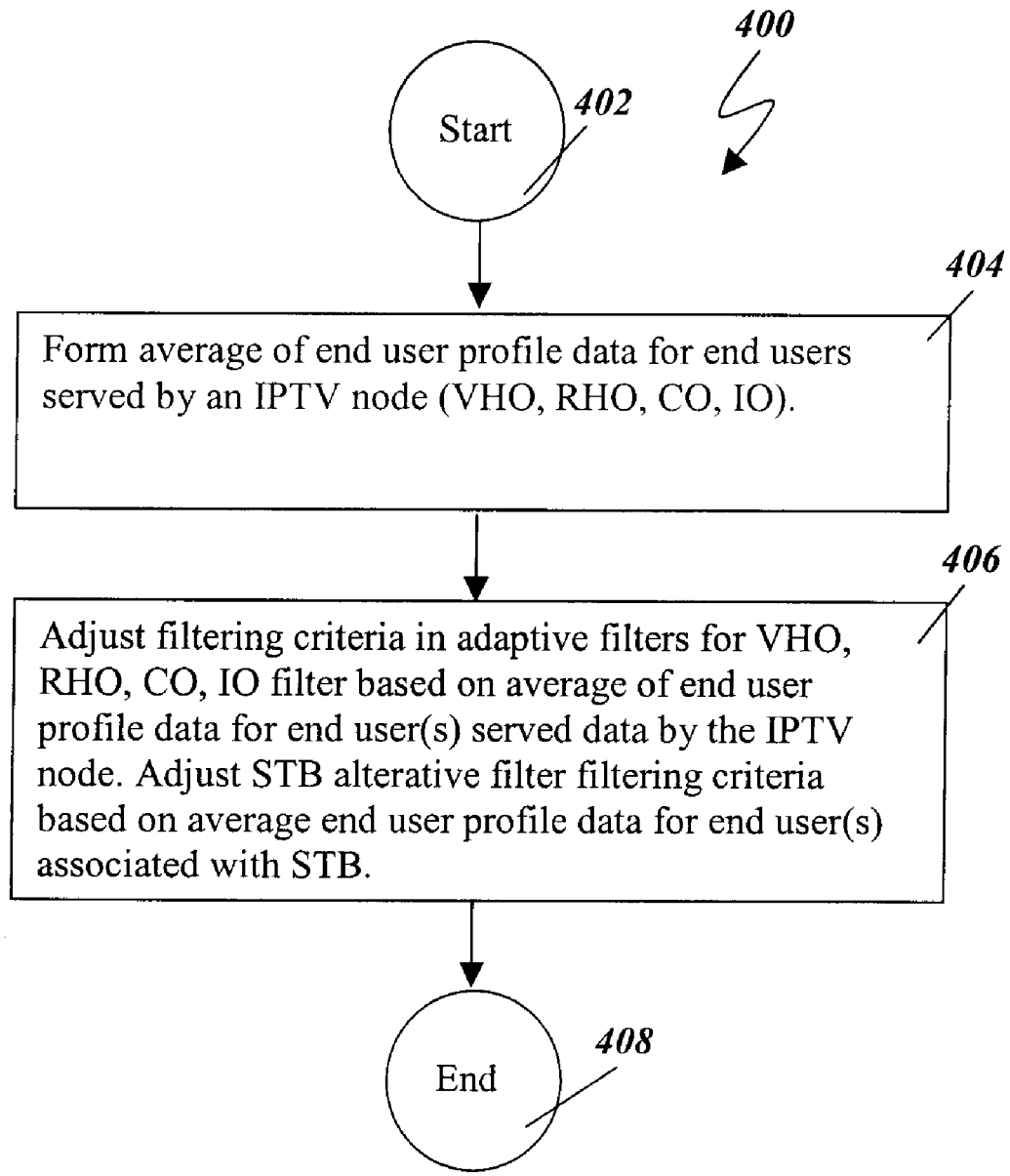
FIG. 4 depicts another flow chart of functions performed in another illustrative embodiment for delivering advertising data.

Turning now to FIG. 4, a group of functions performed in another illustrative embodiment is illustrated in flowchart 400. As shown in flowchart 400, a starting terminal 402 begins the execution of functions shown in the flowchart 400. At block 404 an illustrative embodiment forms an average of end user profile data for end-users associated are served by an IP TV node, which can include but is not limited to SHO, VHO, RHO, CO and IO. In block 406 another illustrative embodiment also adjusts filtering criteria in adaptive filters for each IPTV node based on an average of end user profile data for end users served data by the IPTV node. Another illustrative embodiment, also adjusts STB adaptive filter criteria based on averaging user profile data for end users associated with the STB. The flowchart ends at terminal 408.

Figure 5:
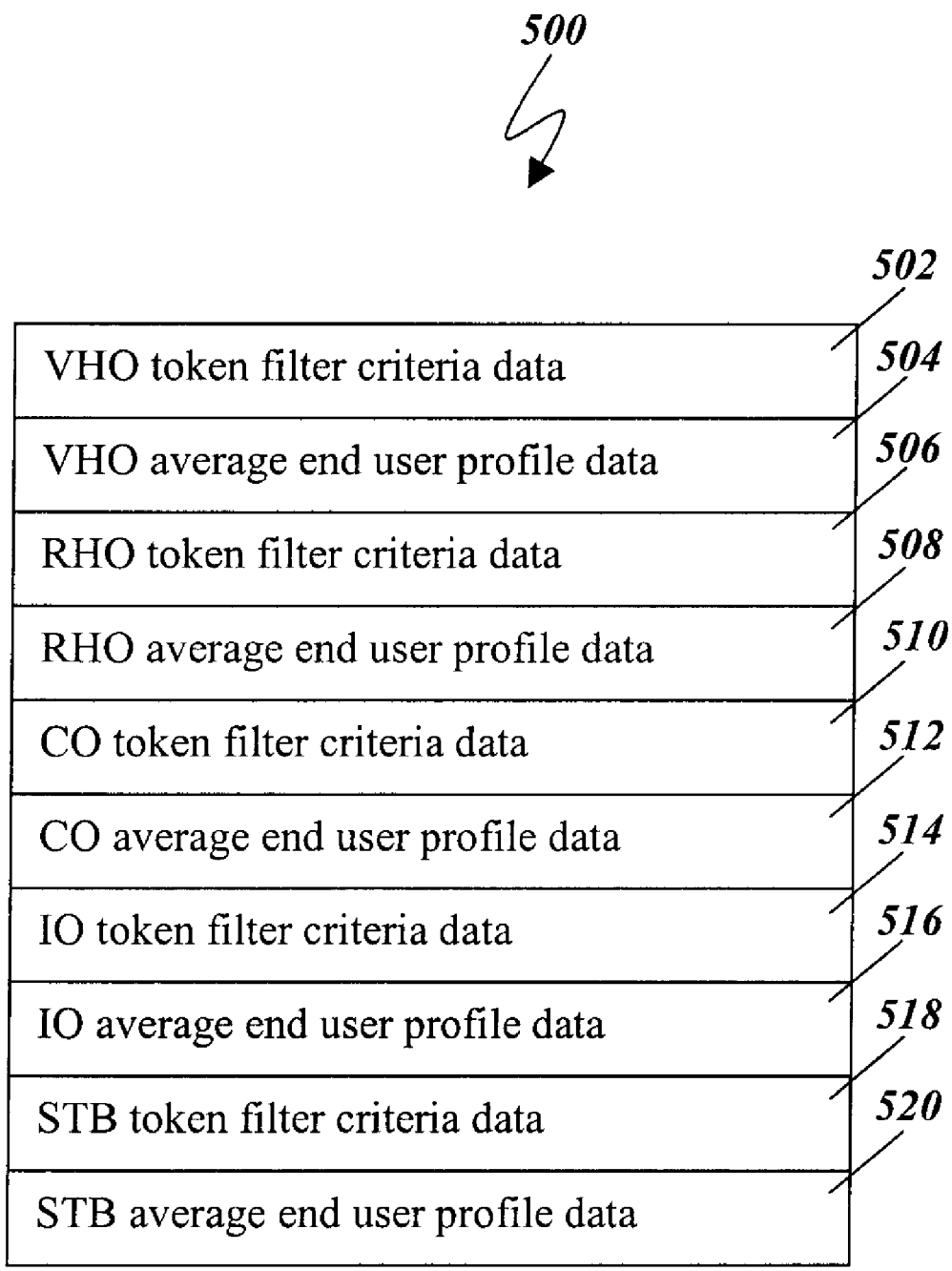
FIG. 5 depicts a data structure embedded in a computer readable medium that is used by a processor and method for delivering advertising data in a illustrative embodiment.

Turning now to FIG. 5, an illustrative embodiment of a data structure 500 embedded in a computer readable medium accessible by a processor is illustrated. As shown in FIG. 5, a VHO token filter criteria data field is illustrated at 502 for containing data indicative of the filter criteria for a VHO filter. A VHO average end user profile data field 504 is illustrated for containing data indicative of the average user profile data for end-users served data by the VHO. The average end user profile data is used by the VHO filter to correlate the token filter criteria data with advertising characteristic data for tokens in the filtering process. Those advertising tokens having advertising characteristic data that correlate with the token filter criteria data are passed by the token filter to the next IPTV node. The token filter criteria data for each IPTV node are based on the average end user profile data for end users served data by the IPTV node.

An RHO token filter criteria data field is illustrated at 506 for containing data indicative of the filter criteria for a RHO filter. A RHO average end user profile data field 508 is illustrated for containing data indicative of the averaging user profile data for end-users served data by the RHO. CO token filter criteria data field is illustrated at 510 for containing data indicative of the filter criteria for a CO filter. A CO average end user profile data field 512 is illustrated for containing data indicative of the averaging user profile data for end-users served data by the CO.

An IO token filter criteria data field is illustrated at 514 for containing data indicative of the filter criteria for an IO filter. An IO average end user profile data field 516 is illustrated for containing data indicative of the averaging user profile data for end-users served data by the IO. STB token filter criteria data field is illustrated at 518 for containing data indicative of the filter criteria for an STB filter. An STB average end user profile data field 520 is illustrated for containing data indicative of the averaging user profile data for substantially all end-users devices associated with the STB.

Figure 6:
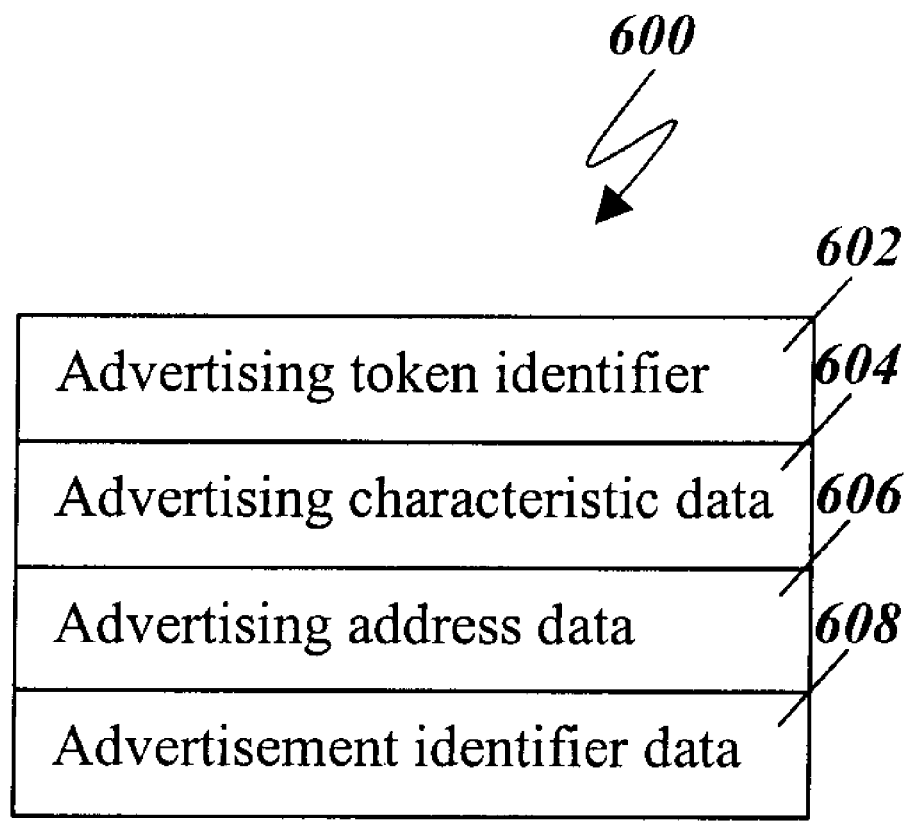
FIG. 6 depicts another data structure embedded in a computer readable medium that is used by a processor and method for delivering advertising data in a illustrative embodiment.

Turning now to FIG. 6 a data structure 600 is illustrated embedded in computer readable medium memory and accessible by a processor. As shown in FIG. 6, an advertising token identifier field 602 is shown for retaining data indicative of an advertising token identifier. Advertising token identifiers are used to string together advertising tokens for a particular advertisement associated with a particular URI and end-user device. In another embodiment, the data structure further includes an advertising characteristic data field 604 for containing data indicative of an advertising characteristic for advertising data associated with the advertising token. The advertising a characteristic data is utilized by the adaptive filters at the IPTV nodes and servers to filter out advertising tokens that have advertising characteristics data that correlate with the end-user profiles data for end users associated with a particular IPTV node. The data structure further includes an advertising address data field 606 for containing advertising address data indicative of an advertising address for the advertising token. The advertising address data is utilized to form a concatenated URI address for a particular end-user by concatenating advertising address data for filtered advertising tokens. An advertisement identifier data field 608 is shown for containing data indicative of an advertisement identifier. The advertisement identifier is used to match tokens associated with the same advertisement.

Figure 7:
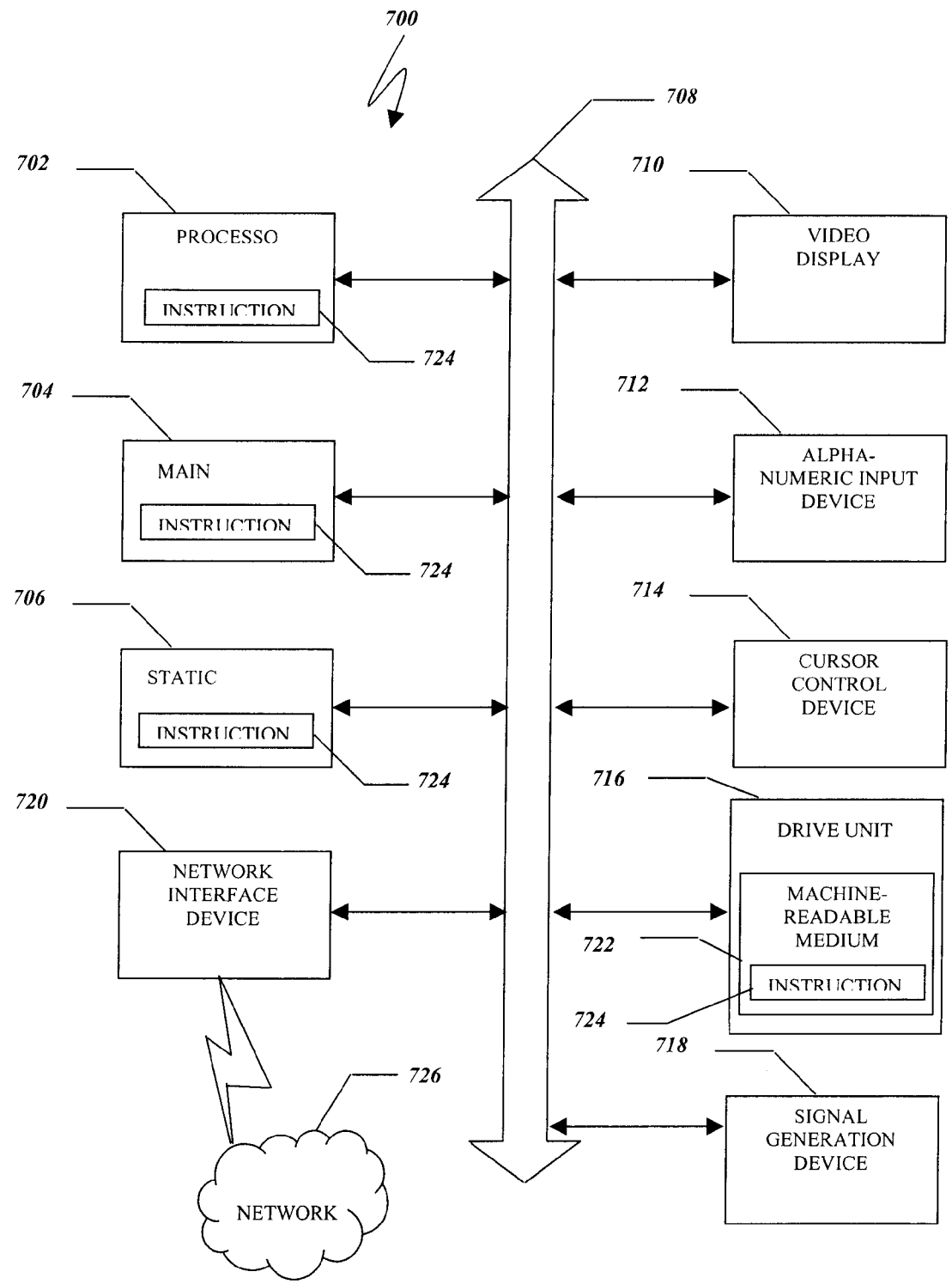
FIG. 7 depicts an illustrative embodiment of a machine for performing functions disclosed in an illustrative embodiment.

FIG. 7 is a diagrammatic representation of a machine in the form of a computer system 700 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine.

It will be understood that a device of the present invention includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., liquid crystals display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface.

The disk drive unit 716 may include a machine-readable medium 722 on which is stored one or more sets of instructions (e.g., software 724) embodying any one or more of the methodologies or functions described herein, including those methods illustrated in herein above. The instructions 724 may also reside, completely or at least partially, within the main memory 704, the static memory 706, and/or within the processor 702 during execution thereof by the computer system 700. The main memory 704 and the processor 702 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present invention, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present invention contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720. The machine readable medium may also contain a data structure for containing data useful in providing a functional relationship between the data and a machine or computer in an illustrative embodiment of the disclosed system and method.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the invention is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A tangible non-transitory computer readable storage medium, having a computer program embedded therein, that when executed by a processor performs a method useful for delivering advertising data in an internet protocol television system, the computer program comprising:

instructions to receive at a plurality of internet protocol television system nodes having a plurality of system node filters located upstream from an end user device in the internet protocol television system, a plurality of advertising tokens, wherein each of the advertising tokens contain advertising tokens data, advertising characteristics data and address data;

instructions to adaptively and sequentially filter on at least two of the plurality of internet protocol television system nodes, the advertising tokens data from at least two of the advertising tokens based on a correlation between the advertising characteristics data and adaptive filtering criteria data wherein the adaptive filtering criteria data differs at each of the plurality of internet protocol television system nodes and is based on monitoring profile data and adaptively updating the advertising filtering criteria data for each of internet protocol television system node filters to represent an adaptively updated average profile for a plurality of current end users served by each of the internet protocol television system nodes;

instructions to extract separate portions of an adaptive uniform resource indicator from the at least two of the advertising tokens that have been sequentially filtered through the at least two of the plurality of internet protocol television system node filters, the address data representing at least two portions of an adaptive uniform resource indicator advertising address on the Internet World Wide Web, based on the address data in the each of the at least two advertising tokens that have passed through the at least two of the plurality of internet protocol television system node filters;

instructions to concatenate the address data from the at least two advertising tokens that have sequentially passed through the at least two of the plurality of internet protocol television system node adaptive filters to form the adaptive uniform resource indicator advertising address for a web site on the Internet World Wide Web; and instructions to receive advertising data from the web site indicated by the adaptive uniform resource indicator advertising address to the end user device through an internet protocol television system node.

2. The medium of claim 1, wherein the address data further comprise portions of a uniform resource indicator address received at an internet protocol television node selected from the group consisting of video hub office, regional hub office, central office, intermediate office and set-top box.

3. The medium of claim 1, wherein the instructions to send the advertising data further comprise instructions to insert the advertising data into an internet protocol television video data stream being sent to the end user device from the internet protocol television system node.

4. The medium of claim 1, the computer program further comprising:
instructions to adaptively adjust the adaptive filtering criteria data based on an average of end user profile data for end users served by the internet protocol television system node.

5. The medium of claim 4, wherein the average end user profile data are selected from the group consisting of age, gender, ethnicity, physical location, income, interests, purchase history, viewing history, and family size.

6. The medium of claim 1, the computer program further comprising:
instructions to receive follow on advertising token data;
instructions to extract follow on address data from the follow on advertising token data;
instructions to concatenate the follow on address data from the follow on advertising token data to the adaptive uniform resource indicator advertising address to form a follow on uniform resource indicator advertising address; and
instructions to send follow on advertising data from a web site at the follow on uniform resource indicator advertising address through an internet protocol television system node to the end user device.

7. The medium of claim 6, the computer program further comprising:
instructions to receive follow on request data from the end user device for the follow on advertising data.

8. The medium of claim 1, the computer program further comprising:
instructions to receive update token data;
instructions to compare token identifier data in the update token data to token identifier data for a plurality of advertising tokens;
and
instructions to replace the advertising token having the same token identifier data as the token identifier as the replacement token, with the replacement token.

9. The medium of claim 1, wherein the instructions to concatenate the address data from the adaptively filtered advertising tokens data further comprise instructions to compare advertisement identifier data from the advertising tokens and instructions to concatenate the address data for the advertising tokens having the same advertisement identifier data.

10. A system for delivering advertising data in an internet protocol television system, the system comprising:
a processor in data communication with a tangible non transitory computer readable storage medium;
an adaptive filter in data communication with the processor; and
a computer program embedded in the computer readable medium, the computer program comprising instructions to receive at a plurality of internet protocol television system nodes having a plurality of system node filters located in the internet protocol television system up stream from an end user device, a plurality of advertising tokens, wherein each of the advertising tokens contain advertising tokens data further comprising advertising characteristics data and address data,
instructions to adaptively and sequentially filter on at least two of the plurality of internet protocol television system node, the advertising tokens data from the at least two of the plurality of advertising tokens based on a correlation between the advertising characteristic data and adaptive filtering criteria data differs at each of the plurality of internet protocol television system nodes and is based on profile data and adaptively updating the advertising filtering criteria data for each of the internet protocol television system node filters to represent a set of adaptively updated average profile for current end users served by each of the internet protocol television system nodes,
instructions to extract separate portions of a uniform resource indicator address from the at least two advertising tokens that have passed through the at least two of the plurality of internet protocol television system node filters, the address data representing at least two portions of the adaptive uniform resource indicator advertising addresses on the Internet World Wide Web, based on address data in the each of the advertising tokens that have passed through the at least two of the plurality of internet protocol television system node filters;
instructions to concatenate the address data from the at least two advertising tokens that have been passed through the at least two of the plurality of internet protocol television system node filters to form an adaptive uniform resource indicator advertising address for a first resource on the Internet and instructions to send advertising data from the web site indicated by the adaptive uniform resource indicator advertising address to an end user device through an internet protocol television node.

11. The system of claim 10, wherein the advertising address data further comprise portions of a uniform resource indicator address received at an internet protocol television node selected from the group consisting of video hub office, regional hub office, central office, intermediate office and set-top box.

12. The system of claim 10, wherein the instructions to send the advertising data further comprise instructions to insert the advertising data into an internet protocol television video data stream being sent to the end user device from the internet protocol television system node.

13. The system of claim 10, the computer program further comprising:
instructions to adjust the adaptive filtering criteria data based on an average of end user profile data for end users served by the internet protocol television system node.

14. The system of claim 13, wherein the end user profile data are selected from the group consisting of age, gender, ethnicity, physical location, income, interests, purchase history, viewing history, and family size.

15. The system of claim 10, the computer program further comprising:
instructions to receive follow on advertising token data;
instructions to extract follow on address data from the follow on advertising token data;
concatenating the follow on address data to the adaptive uniform resource indicator to form a follow on uniform resource indicator; and
instructions to send follow on advertising data from a second resource on the Internet at the follow on uniform resource indicator to the end user device.

16. The system of claim 15, the computer program further comprising:
instructions to receive request data from the end user device for the follow on advertising data.

17. The system of claim 10, the computer program further comprising:
instructions to receive update token data;

instructions to compare token identifier data for the update token data to token identifier data for each of the advertising tokens; and instructions to replace advertising token data for an advertising token having a same token identifier data as the token identifier data as the replacement token, with the replacement token data.

18. The system of claim 10, wherein the instructions to concatenate the address data from the filtered advertising tokens data further comprise instructions to compare advertisement identifier data for the advertising tokens data and instructions to concatenate the address data for the advertising tokens having matching advertisement identifier data.

19. A data structure embedded in a tangible non-transitory computer readable storage medium, for containing data used by a computer in delivering targeted advertising, the data structure comprising:

a first field for containing data indicative of a first portion of an adaptive uniform resource indicator from a first advertising token;

a second field for containing data indicative of a second portion of the adaptive uniform resource indicator from a second advertising token for concatenation with the first portion of the adaptive uniform resource indicator to form an adaptive uniform resource indicator for addressing a resource on the Internet to provide advertising data to an end user device, wherein the first and second portion of the adaptive resource indicators are selected based on an adaptive filtering criteria data differs at each of a plurality of internet protocol television system nodes and is based on monitoring profile data and adaptively updating the advertising filtering criteria data for each of internet protocol television system node filters to represent an adaptively updated average profile for a plurality of current end users served by each of the internet protocol television system nodes.

20. The data structure of claim 19, further comprising:
a third field for containing data indicative of an advertising characteristic for the advertising data.

21. The data structure of claim 19, further comprising:
a fourth field containing data indicative of an advertising token identifier for comparison with token identifier data for update token data for replacing the advertising token data with the update token data.

22. The data structure of claim 19, further comprising:
a fifth field containing data indicative of a first advertisement token identifier for a first advertising token for comparison with other advertising token identifiers data for concatenating partial uniform resource indicator address data from the first advertising token with other advertising partial uniform resource indicator address data from other tokens with matching advertisement data identifiers.

* * * * *